(12) United States Patent
Davidson et al.

(10) Patent No.: US 6,550,002 B1
(45) Date of Patent: Apr. 15, 2003

(54) METHOD AND SYSTEM FOR DETECTING A FLUSH OF AN INSTRUCTION WITHOUT A FLUSH INDICATOR

(75) Inventors: Joel Roger Davidson, Austin, TX (US); Hung Oui Le, Austin, TX (US); Alexander Erik Mericas, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/435,067

(22) Filed: Nov. 4, 1999

(51) Int. Cl.⁷ ................................................. G06F 11/30
(52) U.S. Cl. ......................................... 712/216; 714/38
(58) Field of Search ........................... 712/216; 714/35, 714/37, 38, 39, 40, 45, 47, 51

(56) References Cited

U.S. PATENT DOCUMENTS

| | | | |
|---|---|---|---|
| 4,231,106 A | 10/1980 | Heap et al. | 364/900 |
| 5,151,981 A | 9/1992 | Westcott et al. | 395/375 |
| 5,446,876 A | 8/1995 | Levine et al. | 395/184.01 |
| 5,493,673 A | 2/1996 | Rindos, III et al. | 395/550 |
| 5,528,753 A | 6/1996 | Fortin | 395/183.11 |
| 5,557,548 A | 9/1996 | Gover et al. | 364/551.01 |
| 5,572,672 A | 11/1996 | Dewitt et al. | 395/184.01 |
| 5,748,855 A | 5/1998 | Levine et al. | 395/800.23 |
| 5,790,843 A | 8/1998 | Borkenhagen et al. | 395/567 |
| 5,809,450 A | 9/1998 | Chrysos et al. | 702/186 |
| 5,923,872 A * | 7/1999 | Chrysos et al. | 712/23 |
| 6,195,748 B1 * | 2/2001 | Chrysos et al. | 712/227 |
| 6,233,256 B1 * | 5/2001 | Dieterich et al. | 370/506 |

* cited by examiner

Primary Examiner—Eric Coleman
(74) Attorney, Agent, or Firm—Duke W. Yee; Mark E. McBurney; Michael R. Nichols

(57) ABSTRACT

A method and system for detecting flushed instructions without a flush indicator is provided. In order to monitor the flushing of an instruction in an instruction pipeline of a processor, an instruction is selected as a sampled instruction and the progress of the sampled instruction through the instruction pipeline is monitored. Upon selection of an instruction as a sampled instruction, a countdown value is initialized to a value equal to the maximum number of instructions within the instruction pipeline, and as instructions complete, the countdown value is decremented. If progress of the sampled instruction is detected as the instruction moves through the instruction pipeline, the countdown value is reinitialized. If the countdown value reaches zero, then a flush of the sampled instruction from the instruction pipeline is presumed, and an indication that the sampled instruction has been flushed is generated. In response to the indication that the sampled instruction has been flushed, a subsequent instruction may be selected as a subsequently sampled instruction.

26 Claims, 5 Drawing Sheets

| BITS 0-4 COUNTING ENABLES | BIT 5 INTERRUPT ENABLE | BITS 6-15 | BIT 16 PMC2 INTERRUPT CONTROL | BIT 17 PMC2 INTERRUPT CONTROL | BIT 18 PMC2 COUNT CONTROL | BITS 19-25 PMC1 EVENT SELECTION | BITS 26-31 PMC2 EVENT SELECTION |

MONITOR MODE CONTROL REGISTER
(MMCR)

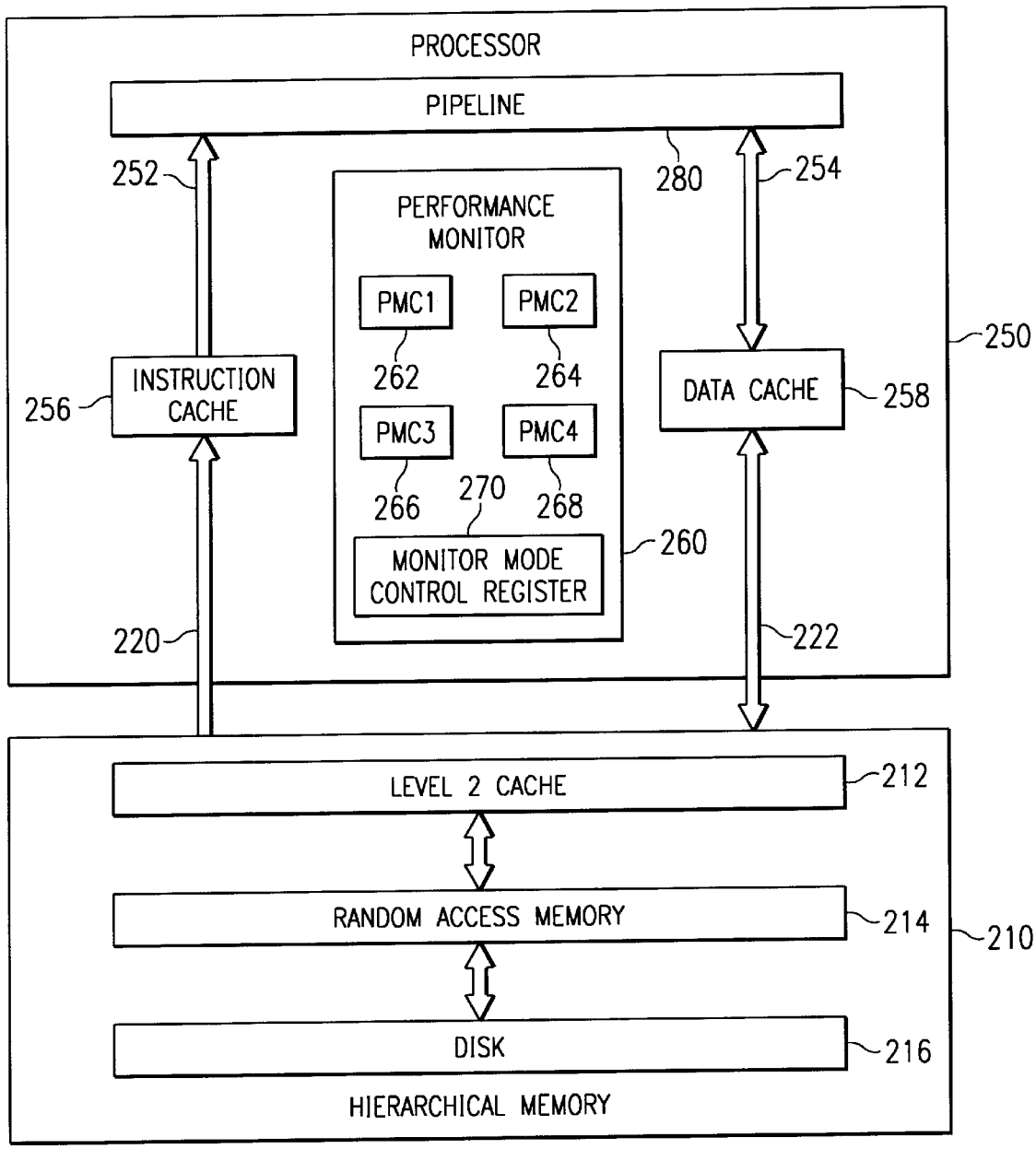

METHOD AND SYSTEM FOR DETECTING A FLUSH OF AN INSTRUCTION WITHOUT A FLUSH INDICATOR

CROSS REFERENCE TO RELATED APPLICATIONS

The present invention is related to the following applications entitled "METHOD AND APPARATUS FOR INSTRUCTION SAMPLING FOR PERFORMANCE MONITORING AND DEBUG", U.S. application Ser. No. 09/435,069, and "METHOD AND APPARATUS FOR IDENTIFYING INSTRUCTIONS FOR PERFORMANCE MONITORING IN A MICROPROCESSOR", U.S. application Ser. No. 09/436,109, all of which are assigned to the same assignee and incorporated herein by reference.

BACKGROUND OF THE INVENTION

1. Technical Field

The present invention relates generally to an improved data processing system and, in particular, to a method and system for monitoring instruction execution within a processor in a data processing system.

2. Description of Related Art

In typical computer systems utilizing processors, system developers desire optimization of software execution for more effective system design. Usually, studies are performed to determine system efficiency in a program's access patterns to memory and interaction with a system's memory hierarchy. Understanding the memory hierarchy behavior helps in developing algorithms that schedule and/or partition tasks, as well as distribute and structure data for optimizing the system.

Within state-of-the-art processors, facilities are often provided which enable the processor to count occurrences of software-selectable events and to time the execution of processes within an associated data processing system. These facilities are known as the performance monitor of the processor. Performance monitoring is often used to optimize the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

Events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

To evaluate the efficiency of a processor, it is necessary to determine how much work is performed and how many resources are consumed on behalf of executing instructions. Many modern processors implement speculative processing to achieve high performance. As a result, some of the instructions that are processed may be canceled or flushed without completely executing because the condition for which they were speculatively executed did not occur. Like any other instruction, speculative instructions consume resources within the processor.

Most modern processors implement performance monitor counters that count the occurrence of predefined events associated with the use of resources. However, in a processor with both performance monitoring and speculative execution of instructions, performance monitor counters count events for both non-speculative instructions, i.e. instructions which complete execution, and speculative instructions, i.e. instructions which do not complete. Time is a critical resource within a processor, and as with most operations within a processor, instruction flushing is completed as quickly as possibly. Hence, it is not desirable at the time that instructions are flushed to inspect, flag, and/or count which instructions are being flushed.

Therefore, it would be advantageous to have a method and system for monitoring the use of resources accurately within a processor that performs speculative execution of instructions. It would be further advantageous to have a method and system monitoring the flushing of particular instructions without slowing the flushing functionality.

SUMMARY OF THE INVENTION

A method and system for detecting flushed instructions without a flush indicator is provided. In order to monitor the flushing of an instruction in an instruction pipeline of a processor, an instruction is selected as a sampled instruction and the progress of the sampled instruction through the instruction pipeline is monitored. Upon selection of an instruction as a sampled instruction, a countdown value is initialized to a value equal to the maximum number of instructions within the instruction pipeline, and as instructions complete, the countdown value is decremented. If progress of the sampled instruction is detected as the instruction moves through the instruction pipeline, the countdown value is reinitialized. If the countdown value reaches zero, then a flush of the sampled instruction from the instruction pipeline is presumed, and an indication that the sampled instruction has been flushed is generated. In response to the indication that the sampled instruction has been flushed, a subsequent instruction may be selected as a subsequently sampled instruction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram depicting selected, internal, functional units of a data processing system for processing information in accordance with a preferred embodiment is an illustration providing an example representation of one configuration of a monitor mode control register suitable for controlling the operation of two performance monitor counters;

DETAILED DESCRIPTION OF THE PREFERRED EMBODIMENT

Figures 1, 3:
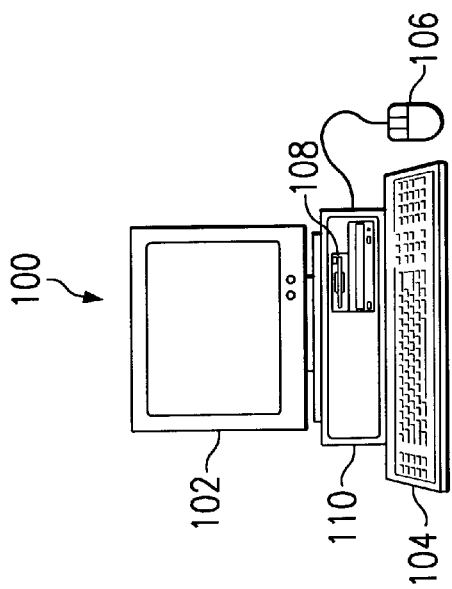
FIG. 1 is a pictorial representation depicting a data processing system in which the present invention may be implemented in accordance with a preferred embodiment of the present invention.
FIG. 3 is an illustration providing an example representation of one configuration of an MMCR suitable for controlling the operation of two PMCs.

With reference now to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, workstations, network computers, Internet appliances, hand-held computers, etc. System unit 110 comprises memory, a central processing unit, I/O unit, etc. However, in the present invention, system unit 110 contains a speculative processor, either as the central processing unit or as one of multiple CPUs present in the system unit.

With reference now to FIG. 2, a block diagram depicts selected internal functional units of a data processing system for processing information in accordance with a preferred embodiment of the present invention. System 200 comprises hierarchical memory 210 and processor 250. Hierarchical memory 210 comprises Level 2 cache 212, random access memory (RAM) 214, and disk 216. Level 2 cache 212 provides a fast access cache to data and instructions that may be stored in RAM 214 in a manner which is well-known in the art. RAM 214 provides main memory storage for data and instructions that may also provide a cache for data and instructions stored on non-volatile disk 216.

Data and instructions may be transferred to processor 250 from hierarchical memory 210 on instruction transfer path 220 and data transfer path 222. Transfer path 220 and data transfer path 222 may be implemented as a single bus or as separate buses between processor 250 and hierarchical memory 210. Alternatively, a single bus may transfer data and instructions between processor 250 and hierarchical memory 210 while processor 250 provides separate instruction and data transfer paths within processor 250, such as instruction bus 252 and data bus 254.

Processor 250 also comprises instruction cache 256, data cache 258, performance monitor 260, and instruction pipeline 280. Performance monitor 260 comprises performance monitor counter (PMC1) 262, performance monitor counter (PMC2) 264, performance monitor counter (PMC3) 266, performance monitor counter (PMC4) 268, and monitor mode control register (MMCR) 270. Alternatively, processor 250 may have other counters and control registers not shown.

Processor 250 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 280 via instruction cache 256. Instruction pipeline 256 decodes and executes the instructions that have been staged within the pipeline. Some instructions transfer data to or from hierarchical memory 210 via data cache 258. Other instructions may operate on data loaded from memory or may control the flow of instructions.

Performance monitor 260 comprises event detection and control logic, including PMC1–PCM4 262–268 and MMCR 270. Performance monitor 260 is a software-accessible mechanism intended to provide detailed information with significant granularity concerning the utilization of processor instruction execution and storage control. The performance monitor may include an implementation-dependent number of performance monitor counters (PMCs) used to count processor/storage related events. These counters may also be termed "global counters". The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, PMC1–PMC4 are 32-bit counters and MMCR is a 32-bit register. One skilled in the art will appreciate that the size of the counters and the control registers are dependent upon design considerations, including the cost of manufacture, the desired functionality of processor 250, and the chip area available within processor 250.

Performance monitor 260 monitors the entire system and accumulates counts of events that occur as the result of processing instructions. In the present invention, processor 250 allows instructions to execute out-of-order with respect to the order in which the instructions were coded by a programmer or were ordered during program compilation by a compiler. Processor 250 also employs speculative execution to predict the outcome of conditional branches of certain instructions before the data on which the certain instructions depend is available. The MMCRs are partitioned into bit fields that allow for event/signal selection to be recorded/counted. Selection of an allowable combination of events causes the counters to operate concurrently. When the performance monitor is used in conjunction with speculatively executed instructions in the manner provided by the present invention, the performance monitor may be used as a mechanism to monitor the performance of the processor during execution of both completed instructions and speculatively executed yet uncompleted instructions.

With reference now to FIG. 3, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled. Alternatively, an MMCR may set an initialization count value, which is not shown in the figures.

The initialization count value is both variable and software selectable. The initialization count value may be loaded into a counter when an instruction is first scheduled for execution. For example, given that the event under study is "register accesses", if the initialization count value denotes a number of register accesses for an associated instruction, then completion of the instruction allows the number of register accesses for the particular instruction to be added to the total event count in a PMC that counts all register accesses by all instructions. Of course, depending on the data instruction being executed, "complete" may have different meanings. For example, for a "load" instruction, "complete" indicates that the data associated with the instruction was received, while for a "store" instruction, "complete" indicates that the data was successfully written. A user-readable counter, e.g., PMC1, then provides software access of the total number of register accesses since PMC1 was first initialized. With the appropriate values, the performance monitor is readily suitable for use in identifying system performance characteristics.

Bits 0–4 and 18 of the MMCR in FIG. 3 determine the scenarios under which counting is enabled. By way of example, bit zero may be a freeze counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals triggered by PMCs. Bits 6–9 may be utilized to control time or event-based transitions. Bits 19–25 may be used for event selection for PMC1, i.e. selection of signals to be counted for PMC1. The function and number of bits may be chosen as necessary for selection of events as needed within a particular implementation.

At least one counter is required to capture data for some type of performance analysis. More counters provide for faster or more accurate analysis. If the monitored scenario is strictly repeatable, the same scenario may be executed with different items being selected. If the scenario is not strictly repeatable, then the same scenario may be executed with the same item selected multiple times to collect statistical data. The time from the start of the scenario is assumed to be available via system time services so that intervals of time may be used to correlate the different samples and different events.

Figure 4:
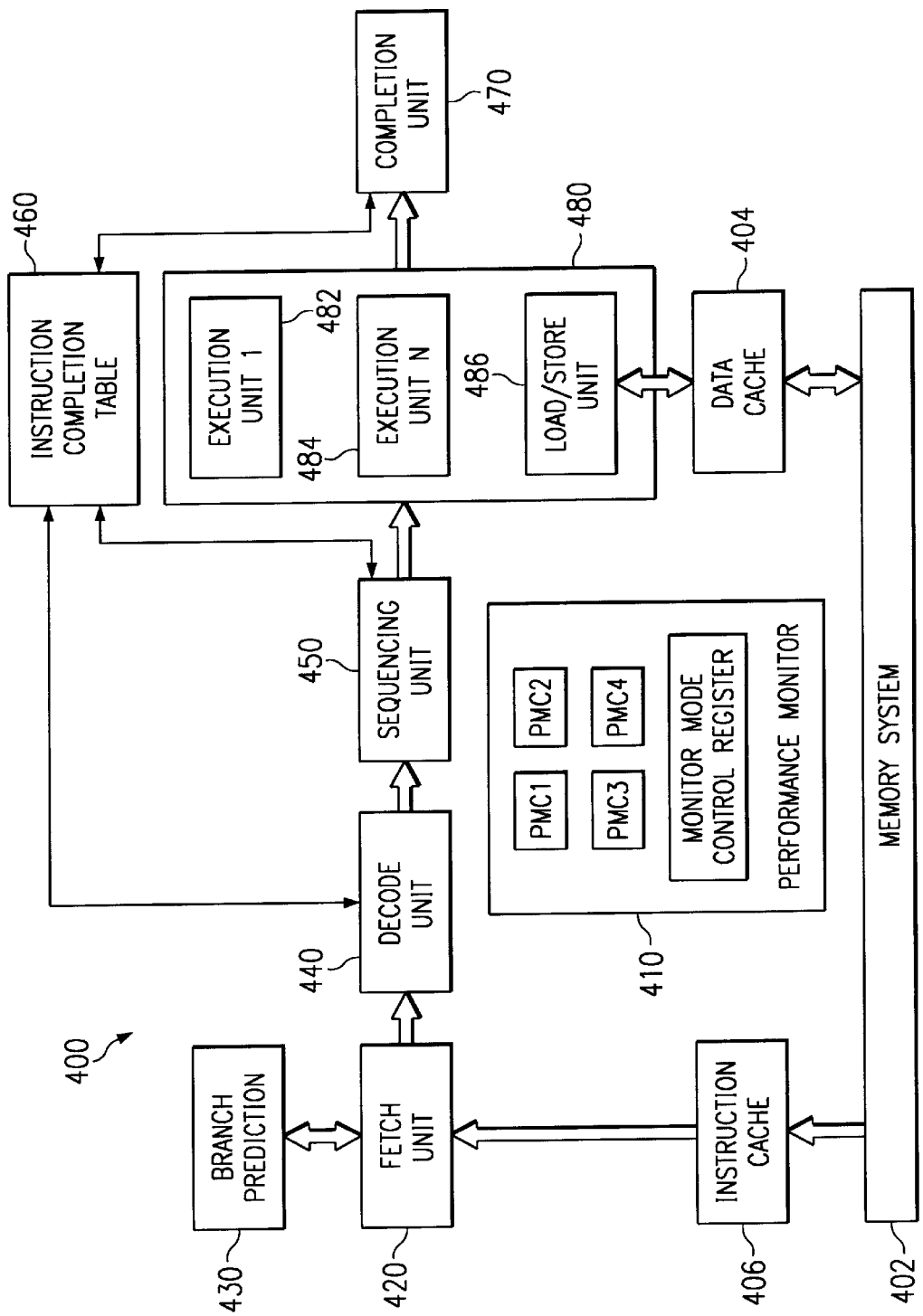
FIG. 4 is a block diagram depicting further detail of the stages of an instruction pipeline within an out-of-order, speculative execution processor.

With reference now to FIG. 4, a block diagram depicts further detail of the stages of an instruction pipeline within an out-of-order, speculative execution processor. System 400 shows memory system 402, data cache 404, instruction cache 406, and performance monitor 410, which may be similar to the hierarchical memory, data cache, instruction cache, and performance monitor shown in FIG. 3. As instructions are executed, they cause events within the processor, such as cache accesses. Performance monitor 410 contains a plurality of PMCs that count events under the control of one or more MMCRs. The counters and the MMCRs are internal processor registers and can be read or written under software control.

Fetch unit 420 retrieves instructions from instruction cache 406, which in turn retrieves instructions from memory 402. Decode unit 440 decodes instructions to determine basic information about the instruction, such as instruction type, source registers, and destination registers. Sequencing unit 450 uses the decoded information to schedule instructions for execution. In order to track instructions, completion table 460 is used for storing and retrieving information about scheduled instructions.

Out-of-order processors typically use a table to track instructions. Known as a completion buffer, a re-order buffer, or a completion table, it is a circular queue with one entry for every instruction or group of instructions. As sequencing unit 450 assigns the dispatched instruction to an associated entry in completion table 460, sequencing unit 450 assigns or associates entries to executing instructions on a first-in, first-out basis or rotating manner. As the instructions are executed, information concerning the executing instructions is stored into various fields and subfields of the associated entry of completion table 460 for the particular instruction.

Instructions executed by execution control unit 480 using one of the execution units 1-N, such as execution unit #1 482 or execution unit #N 484, may use load/store unit 486 to cause data to be read from or written to memory 402 via data cache 404. As instructions complete, completion unit 410 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction specifies a new memory location from which to begin fetching instructions. When fetch unit 420 receives a conditional branch operation and the data upon which the condition is based is not yet available (e.g., the instruction that will produce the necessary data has not been executed), fetch unit 420 may use one or more branch prediction mechanisms in branch prediction control unit 430 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 5:
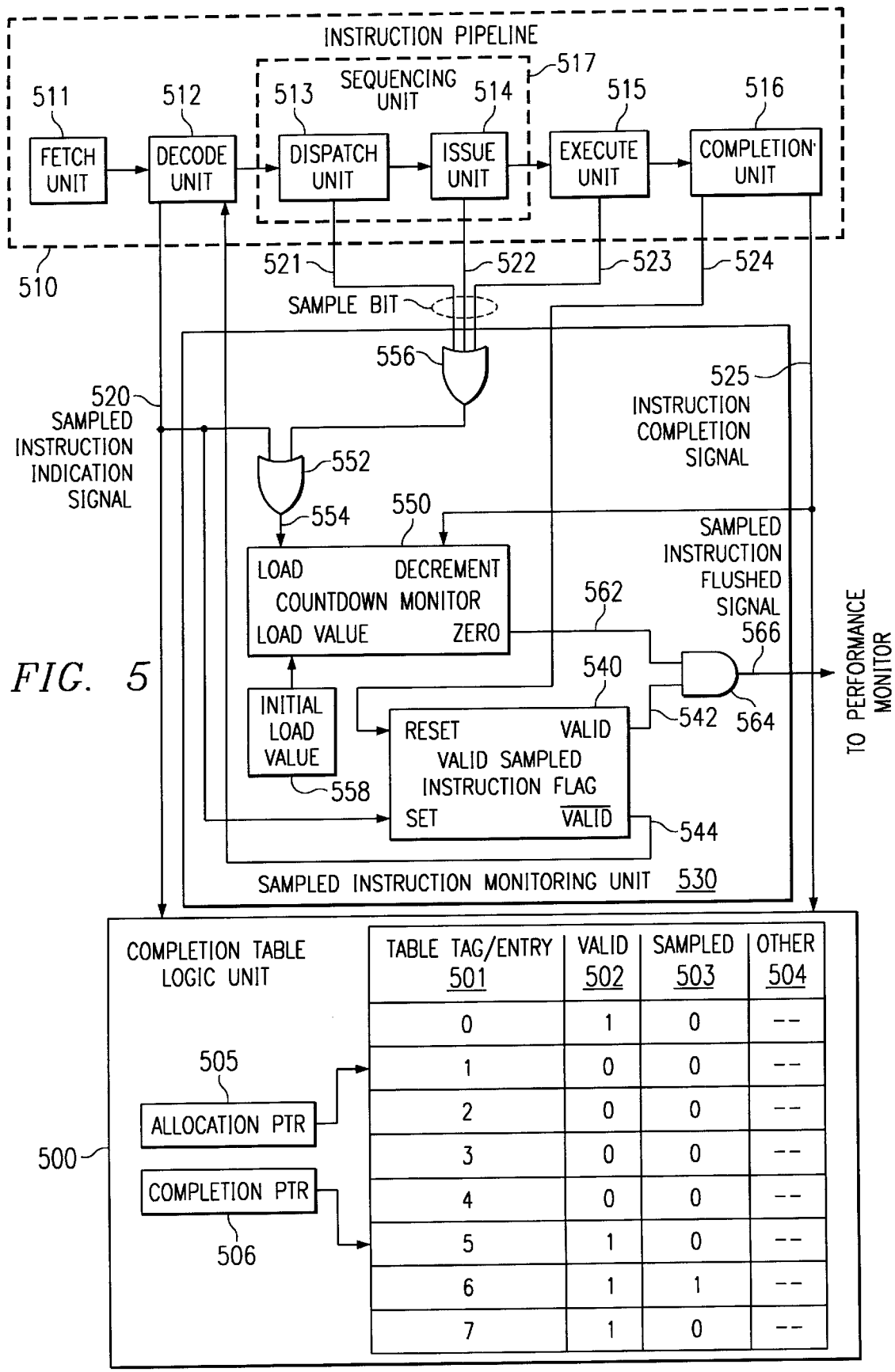
FIG. 5 is a diagram illustrating a sampled instruction monitoring unit that may be used to monitor for the flushing of sampled instructions in accordance with a preferred embodiment of the present invention.

With reference now to FIG. 5, a diagram illustrates a sampled instruction monitoring unit that may be used to monitor for the flushing of sampled instructions in accordance with a preferred embodiment of the present invention. Completion table logic unit 500 contains an instruction completion table that is organized as a circular list with each entry in the completion table tracking a single instruction. An instruction is said to have a "tag value" equal to its index value or entry number in the completion table. Table tag/entry 501 may or may not be stored within the completion table. The tag value allows a unit within the processor to associate identified events with a particular instruction. For example, an instruction completion unit may use the tag value of the instruction whose execution is being completed to identify the completing instruction. By identifying the completing instruction, the completion table entry for the completing instruction may then be updated to indicate that the completion table entry may be reused.

Valid flag or bit 502 in the instruction completion table identifies those instructions within the instruction completion table that have not yet completed their execution. Sampled bit or flag 503 indicates that an instruction within the instruction completion table has been selected as a sampled instruction, which is explained in more detail further below. Other information associated with an instruction within the instruction completion table may be stored in the completion table, for example, in a field such as "other" 504.

Allocation pointer 505 holds the index of the next available entry in the instruction completion table. Completion pointer 506 holds the index of the oldest instruction in the instruction completion table or the index of the next instruction that is expected to complete its processing. If no completion table entries are available, then the sequencing unit of the processor stalls until an entry is available.

FIG. 5 shows exemplary data within the instruction completion table in which the completion pointer points to entry 5 and the allocation pointer points to entry 1. The instruction in entry 5 is the instruction which is expected to complete its processing next. Instructions in entries 0 and 5–7 may be waiting to execute, currently executing, or waiting to complete as indicated by their Valid flags. The next instruction to be decoded will be allocated entry 1 and the allocation pointer will increment to point to entry 2. If the allocation pointer points to entry 7 and another entry needs to be allocated, then the allocation pointer wraps to entry 0 in a circular fashion. In this example, if the allocation pointer pointed to entry 5, no more entries would be available. It should be noted that the instructions within the instruction completion table do not necessarily execute in the order in which they were placed in the completion table. Instructions are inserted into the completion table in the order that they are coded by the programmer, i.e. they are placed in the table in program-order. Instructions may execute out of order, but they must complete in the order that they entered into the completion table.

Alternatively, a single completion table entry may be allocated for a group of instructions. All of the instructions within the group may then be tracked with a single tag value.

Instruction pipeline 510 contains stages of an instruction pipeline similar to those shown in FIG. 4. Units 511–516 depict individual stages of an instruction pipeline. Fetch unit 511 fetches instructions from memory, and decode unit 512 decodes the instructions to determine the type of instruction, its operands, and the destination of its result. Dispatch unit 513 requests operands for an instruction, and issue unit 514 determines that an instruction may proceed with execution. Execute unit 515 performs the operation on the operands as indicated by the type of instruction. Completion unit 516 deallocates any internal processor resources such as the commitment of registers, that were required by the instruction. Depending upon system implementation, an instruction pipeline may have more or less stages. For example, the functions of dispatch unit 513 and issue unit 514 may be performed by a single unit, such as a scheduling unit or sequencing unit 517.

Decode unit 512 contains an instruction sampler unit. Instruction sampling is a technique in which a single instruction is chosen, i.e. sampled, and detailed information is collected on that instruction. Instruction sampling is typically used for performance monitoring but may also be used for debug purposes. Instructions may be sampled based on a variety of selection mechanisms, each of which may be configurably controlled. An instruction may be selected at random, in which case a performance monitor may capture the instruction address after the instruction has been randomly selected. An instruction may be selected based on a general category of its instruction type, such as selecting any store instruction, or based on an operand source or operand destination. A specific type of instruction may be selected, such as a load instruction, or even more particularly, a load instruction that uses particular registers. As another alternative, an instruction may be selected based on its instruction address, which provides functionality for a debugging program to store specific instructions at specific addresses and then to allow the processor to execute the instructions without setting interrupts or traps. The above list merely provides some examples and should not be considered an exhaustive list of potential instruction sampling mechanisms.

Instructions may be chosen for sampling in the fetch or decode stage of the processor pipeline. In instruction pipeline 510 shown in FIG. 5, the instruction sampler unit is embedded within decode unit 512. The instruction sample unit may receive a signal from the performance monitor that indicates that the next sampled instruction may be chosen. Once an instruction is chosen, the instruction is "marked" with a sample bit that accompanies the instruction through the instruction pipeline. As the sampled instruction flows through each pipeline unit or each stage of the instruction pipeline, each pipeline unit may use or output the sample bit associated with the instruction being processed by the unit to indicate that the instruction within the unit is a sampled instruction. In this manner, a non-zero sample bit output by a unit in the instruction pipeline serves to assert a signal that may be used for a variety of purposes, as explained in further detail below.

Decode unit 512 selects an instruction in the instruction stream as a sampled instruction. To indicate that an instruction has been selected, decode unit 512 sends sampled instruction indication signal 520 to completion table logic unit 500, which then sets the sampled flag of the entry associated with the instruction given its instruction or table tag. Units 513–516 provide signals 521–524 using the sample bit of the instruction being processed by the unit. The sample bit from the various pipeline stages provides an effective progress indicator for the sampled instruction as it moves along the instruction pipeline. As instructions complete, completion unit 516 provides an instruction completion signal 525 that may be used by completion table logic unit 500 to deallocate the completion table entry of the completing instruction given its instruction or table tag. Using instruction pipeline 510, completion table logic unit 500, sampled instruction indication signal 520, sample bit signals 521–524, and instruction completion signal 525, the processor may monitor when an instruction has been chosen for sampling, follow the sampled instruction's progress through the instruction pipeline, and monitor when all instructions complete, especially the completion of a sampled instruction.

However, in a speculative processor, instructions may be flushed, including a sampled instruction. If the processor were to wait for sample bit signal 524 to be asserted when the sampled instruction has previously been flushed, then the sampling mechanism would enter a locked state from which it could not recover.

The present invention provides a mechanism to detect when a sampled instruction has been flushed from the instruction pipeline without a flush indicator to do so.

Sampled instruction monitoring unit 530 allows for the sampling mechanism within decode unit 512 to resume the selection of an instruction as a sampled instruction in the shortest and safest amount of time possible without incurring an error of selecting multiple instructions as sampled instructions.

Sampled instruction monitoring unit 530 contains a countdown monitor 550 that maintains a countdown value that is initialized to a starting value when an instruction is first sampled and then reset to this value when a non-zero sample bit is received from a pipeline stage. The countdown value is decremented every time that the completion unit deallocates a completion table entry. By setting the initial value of the countdown value to a minimum value equal to or greater than the size of the completion table, sampled instruction monitoring unit 530 can detect when the entire instruction completion table must have been processed through the instruction pipeline. If the countdown value goes to zero, then sampled instruction monitoring unit 530 determines that the sampled instruction is no longer in the completion table and has been flushed at some previous point in time.

OR gate 552 receives sampled instruction indication signal 520. When decode unit 512 selects an instruction as a sampled instruction and asserts signal 520, OR gate 552 provides load signal 554 to countdown monitor 550, which then loads initial load value 558 as a starting value for the countdown value. Initial load value 558 has a minimum value that is at least equal to the number of entries in the instruction completion table but may have a larger value. Sampled instruction monitoring unit 530 also keeps a valid flag to indicate that the sampled instruction is still "valid", i.e. has not yet been flushed. For example, valid sampled instruction flag 540 may operate similar to a flip-flop and receives sampled instruction indication signal 520 to set the flag indicating that an instruction has been selected as a sampled instruction and is currently valid. When completion unit 516 completes the execution of a sampled instruction and provides its sample bit as signal 524, sampled instruction monitoring unit 530 uses the sample bit of the completing instruction to reset the valid sampled instruction flag 540. Valid signal 542 and not-valid signal 544 may be used to determine when a sampled instruction is no longer valid, such as when a sampled instruction has been flushed, or when another instruction may be chosen as a sampled instruction. For example, not-valid signal 544 may be provided to decode unit 512 in order to notify decode unit 512 that there are no active sampled instructions within the completion table or within the instruction pipeline. Decode unit 512 may then safely select another instruction as a sampled instruction. Alternatively, decode unit 512 may monitor sample bit signal 524 and sampled instruction flushed signal 566 as indications that another instruction may be sampled, thereby obviating the need for valid flag functionality, such as valid sampled instruction flag 540. Alternatively, decode unit 512 may receive a signal from the performance monitor indicating that another instruction may be sampled.

As a sampled instruction moves along the instruction pipeline, sample bit signals 521–523 provide progress indicators that show that a sampled instruction is still active. OR gate 556 accepts signals 521–523 and provides its output as an input into OR gate 552. In this manner, as a sampled instruction moves along the instruction pipeline, countdown monitor 550 will reload initial load value 558 each time it receives an indication that the sampled instruction is still active within the instruction pipeline. In a competing manner, countdown monitor 550 receives instruction completion signal 525 as a decrement signal to decrease the countdown value each time that an instruction completes processing. Hence, the load signal and the decrement signal into countdown monitor 550 represent dueling signals concerning the progress of a sampled instruction through the instruction pipeline.

Countdown monitor 550 asserts zero signal 562 if the countdown value reaches zero after several operations of decrementing the initial load value. If the countdown value reaches zero while the valid sampled instruction flag is true, as represented by valid signal 542, then AND gate 564 logically ands valid signal 542 and zero signal 562 to produce sampled instruction flushed signal 566. This signal may then be provided to the performance monitor. Alternatively, if valid sampled instruction flag 540 is not maintained, the zero signal 562 may be directly output as sampled instruction flushed signal 566.

Figure 6:
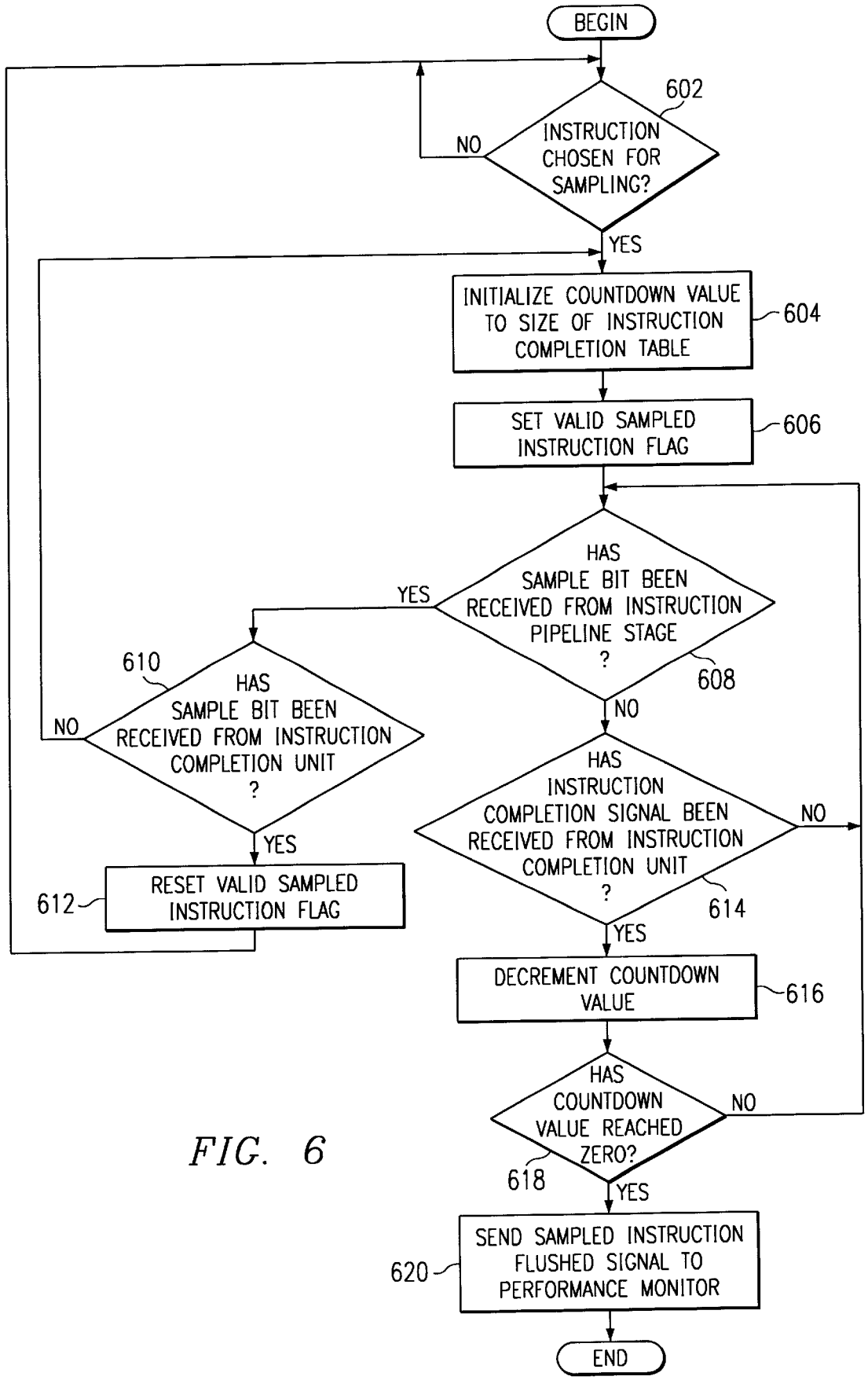
FIG. 6 is a flowchart depicting a process for detecting a flushed instruction without a flush indicating signal in accordance with a preferred embodiment of the present invention.

With reference now to FIG. 6, a flowchart depicts a process for detecting a flushed, monitored instruction without a flush indicating signal in accordance with a preferred embodiment of the present invention. The process begins with a determination as to whether an instruction has been chosen for sampling (step 602). If not, then the process branches back to perform the determination again. In this manner, the monitoring process sits in a wait loop waiting for the selection of a sampled instruction.

If an instruction has been selected for sampling, then the countdown value is initialized to the size of the instruction completion table associated with the instruction pipeline (step 604). The valid sampled instruction flag is then set to indicate that the sampled instruction remains valid and unflushed (step 606).

A determination is then made as to whether a sample bit has been received from a stage of the instruction pipeline (step 608). If so; then a determination is made as to whether the sample bit has been received from the instruction completion unit (step 610). If not, then the process branches back to 604 in order to reinitialize the countdown value. In this manner, the receipt of a sample bit from an instruction pipeline stage other than the instruction completion unit causes the re-initialization of the countdown value because the sampled instruction is still active within the processor.

In contrast, if the sample bit is received from the instruction completion unit, then the valid sampled instruction flag is reset (step 612). Since the sampled instruction has completed processing as indicated by the instruction completion unit, it is safe to select another instruction as the sampled instruction, as will be indicated by the valid sampled instruction flag that has been reset. The process may then branch back to step 602 to wait for the selection of another instruction as a sampled instruction.

If a sample bit has not been received from an instruction pipeline stage, then a determination is made as to whether an instruction completion signal has been received from the instruction completion unit (step 614). If not, then the process branches back to 608 to "wait" or monitor for the receipt of a sample bit from an instruction pipeline stage.

If the instruction completion signal has been received from the instruction completion unit, then the countdown value is decremented (step 616). A determination is then made as to whether the countdown value has reached zero (step 618). If not, the process branches back to 608 to determine whether a sample bit has been received from an instruction pipeline stage.

If the countdown value has reached zero, then a number of instructions equal to the size of the instruction completion table has been executed since monitoring of the sampled instruction commenced, yet a sample bit has not been received from the instruction completion unit. From these facts, it is assumed that the sampled instruction has been previously flushed from the instruction pipeline and the sampled instruction flushed signal is sent to the performance monitor (step 620). The performance monitor may maintain a count of sampled instructions that have been flushed for a variety of diagnostic or debug purposes. The process is then complete with respect to the detection of a flushed instruction without a flush indicator.

The advantages provided by the present invention are apparent in light of the detailed description of the invention provided above. Under certain conditions, it is possible for the performance of a speculative processor to be severely degraded by the speculative execution of instructions that do not complete yet consume processor resources during their partial execution stages. The present invention provides a method and system for monitoring the performance of speculatively executed instructions so that a system designer can ensure that speculative execution of instructions does not severely degrade the performance of the processor.

For example, speculative instructions consume resources within the processor, such as memory bandwidth. The performance of memory access operations, especially when they miss the first level cache, becomes an important consideration since computer systems are forced to use hierarchical memory sub-systems due to the cost sensitivity of the systems. Generally, no memory hierarchy can achieve the ideal performance of all memory locations being accessed as promptly as general purpose registers. The key concept of a hierarchical memory system is that memory accesses usually will be immediately satisfied by first level cache accesses. Expectedly, there will be infrequent but costly first level cache misses. It is desirable that the processor be able to execute efficiently in the presence of first level cache misses. Therefore, one design objective is to utilize a memory hierarchy as efficiently as possible.

One method of efficiently utilizing hierarchical memory systems is to implement out-of-order execution. This gives instructions in the vicinity of instructions incurring first level cache misses the opportunity to execute during the interval when the memory access instructions are delayed by these misses. One of the completion unit's main tasks is to reorder, in an architecturally valid manner, the instructions that are executed out-of-order. One of the main obstacles to executing instructions out-of-order is the serialization of instructions to deal with architectural dependencies. Because a superscalar processor may have instruction level parallelism, it is not enough to simply know that there is a first level cache miss because it may not be causing any delays in the completion of the other instructions, especially when it delays the completion of instructions. The very nature of out-of-order execution causes this to be difficult to ascertain.

As one example of an advantage provided by the present invention, delay effects on the completion of out-of-order execution may be measured for those cycles that are lost due to first level cache misses of speculatively executed instructions that complete. Once specific problems that create such stalls are identified and their relative importance are ascertained, the data may be used to make compiler changes, software changes, and/or hardware design changes. In general, this is one method of monitoring the performance of the branch unit operation. Branch prediction is a large part of branch unit operation. By tracking the counts of events related to the use of resources by instructions that do not complete, one may evaluate the effectiveness of the prediction logic.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring instructions in an instruction pipeline of a processor, the method comprising the steps of:

selecting an instruction as a sampled instruction;

in response to selecting the sampled instruction, loading a countdown register with a value equal to or greater than the maximum number of active instructions in the instruction pipeline;

monitoring progress of the sampled instruction through the instruction pipeline;

in response to an indication of progress of an instruction through a completion stage of the instruction pipeline, decrementing a value in the countdown register;

detecting that the sampled instruction has been flushed from the instruction pipeline by monitoring the countdown register for a value of zero; and in response to the value of the countdown register equaling zero, generating an indication that the sampled instruction has been flushed.

2. The method of claim 1 further comprising:

in response to the indication that the sampled instruction has been flushed, selecting a subsequent instruction as a subsequently sampled instruction.

3. The method of claim 1 further comprising:

in response to selecting the sampled instruction, maintaining a sample bit with the sampled instruction as the sampled instruction progresses through the instruction pipeline.

4. The method of claim 3 further comprising:

indicating progress of the sampled instruction through a stage of the instruction pipeline using the sample bit of the sampled instruction.

5. The method of claim 1 further comprising:

in response to an indication of progress of the sampled instruction through a stage of the instruction pipeline, reloading the countdown register with a value equal to or greater than the maximum number of active instructions in the instruction pipeline.

6. The method of claim 1 further comprising:

in response to selecting the sampled instruction, setting a valid sampled instruction indication.

7. The method of claim 6 further comprising:

in response to an indication of progress of the sampled instruction through a completion stage of the instruction pipeline, resetting the valid sampled instruction indication.

8. The method of claim 7 further comprising:

using the valid sampled instruction indication in order to determine whether to select a subsequent instruction as a subsequently sampled instruction.

9. The method of claim 7 further comprising:

using the valid sampled instruction indication in order to determine whether to generate the indication that the sampled instruction has been flushed.

10. The method of claim 1 wherein flushed instructions include speculatively executed instructions.

11. The method of claim 1 further comprising:

wherein a plurality of flushed sampled instructions are counted by a performance monitor in the processor.

12. A data processing system for monitoring instructions in an instruction pipeline of a processor, the data processing system comprising:

first selecting means for selecting an instruction as a sampled instruction;

loading means for loading, in response to selecting the sampled instruction, a countdown register with a value equal to or greater than the maximum number of active instructions in the instruction pipeline;

monitoring means for monitoring progress of the sampled instruction through the instruction pipeline;

decrementing means for decrementing, in response to an indication of progress of an instruction through a completion stage of the instruction pipeline, a value in the countdown register;

detecting means for detecting that the sampled instruction has been flushed from the instruction pipeline by monitoring the countdown register for a value of zero; and generating means for generating, in response to the value of the countdown register equaling zero, an indication that the sampled instruction has been flushed.

13. The data processing system of claim 12 further comprising:

second selecting means for selecting, in response to the indication that the sampled instruction has been flushed, a subsequent instruction as a subsequently sampled instruction.

14. The data processing system of claim 12 further comprising:

maintaining means for maintaining, in response to selecting the sampled instruction, a sample bit with the sampled instruction as the sampled instruction progresses through the instruction pipeline.

15. The data processing system of claim 14 further comprising:

indicating means for indicating progress of the sampled instruction through a stage of the instruction pipeline using the sample bit of the sampled instruction.

16. The data processing system of claim 12 further comprising:

reloading means for reloading, in response to an indication of progress of the sampled instruction through a stage of the instruction pipeline, the countdown register with a value equal to or greater than the maximum number of active instructions in the instruction pipeline.

17. The data processing system of claim 12 further comprising:

setting means for setting, in response to selecting the sampled instruction, a valid sampled instruction indication.

18. The data processing system of claim 17 further comprising:

resetting means for resetting, in response to an indication of progress of the sampled instruction through a completion stage of the instruction pipeline, the valid sampled instruction indication.

19. The data processing system of claim 18 further comprising:

first using means for using the valid sampled instruction indication in order to determine whether to select a subsequent instruction as a subsequently sampled instruction.

20. The data processing system of claim 18 further comprising:

second using means for using the valid sampled instruction indication in order to determine whether to generate the indication that the sampled instruction has been flushed.

21. The data processing system of claim 12 wherein flushed instructions include speculatively executed instructions.

22. The data processing system of claim 12 further comprising:

wherein a plurality of flushed sampled instructions are counted by a performance monitor in the processor.

23. A computer program product in a computer-readable medium for use in a data processing system for monitoring instructions in an instruction pipeline of a processor, the computer program product comprising:

first instructions for selecting an instruction as a sampled instruction;

second instructions for loading, in response to selecting the sampled instruction, a countdown register with a value equal to or greater than the maximum number of active instructions in the instruction pipeline;

third instructions for monitoring progress of the sampled instruction through the instruction pipeline;

fourth instructions for decrementing, in response to an indication of progress of an instruction through a completion stage of the instruction pipeline, a value in the countdown register;

fifth instructions for detecting that the sampled instruction has been flushed from the instruction pipeline by monitoring the countdown register for a value of zero; and sixth instructions for generating, in response to the value of the countdown register equaling zero, an indication that the sampled instruction has been flushed.

24. The computer program product of claim 23 further comprising:

instructions for maintaining, in response to selecting the sampled instruction, a sample bit with the sampled instruction as the sampled instruction progresses through the instruction pipeline.

25. The computer program product of claim 24 further comprising:

instructions for indicating progress of the sampled instruction through a stage of the instruction pipeline using the sample bit of the sampled instruction.

26. The method of claim 23 further comprising:

instructions for reloading, in response to an indication of progress of the sampled instruction through a stage of the instruction pipeline, the countdown register with a value equal to or greater than the maximum number of active instructions in the instruction pipeline.

* * * * *